United States Patent [19]

Adler et al.

[11] 4,059,722
[45] Nov. 22, 1977

[54] TERMINAL CONNECTOR FOR ELECTRICAL CABLES

[75] Inventors: Horst Adler; Werner Grella; Hans-Peter Israel, all of Cologne, Germany

[73] Assignee: Felten & Guilleaume Kabelwerke Aktiengesellschaft, Cologne, Germany

[21] Appl. No.: 618,312

[22] Filed: Oct. 1, 1975

[30] Foreign Application Priority Data

Oct. 12, 1974 Germany .............................. 2448705

[51] Int. Cl.² ...................... H02G 15/22; H02G 15/04
[52] U.S. Cl. .................................... 174/19; 174/73 R; 174/75 D; 174/77 R
[58] Field of Search .................... 174/18, 19, 20, 31 R, 174/73 R, 75 R, 75 D, 77 R, 80, 11 BH, 12 BH, 14 BH, 15 BH, 16 BH

[56] References Cited

U.S. PATENT DOCUMENTS

| 1,888,075 | 11/1932 | Eby | 174/19 UX |
| 2,000,748 | 5/1935 | Engster | 174/75 R X |
| 2,057,069 | 10/1936 | Steinmayer | 174/19 |
| 3,541,220 | 11/1970 | Kikuchi et al. | 174/31 R X |
| 3,551,582 | 12/1970 | Palmieri | 174/19 |

FOREIGN PATENT DOCUMENTS

| 49,437 | 8/1968 | Germany | 174/75 R |
| 469,327 | 4/1969 | Switzerland | 174/73 R |
| 1,251,341 | 10/1971 | United Kingdom | 174/73 R |
| 1,348,834 | 3/1974 | United Kingdom | 174/75 D |

Primary Examiner—Laramie E. Askin
Attorney, Agent, or Firm—Michael J. Striker

[57] ABSTRACT

A terminal connector for high-current electrical cables includes an electrically-insulating casing of resin-impregnated glass fibers surrounding an end portion of an electrical cable, and a conductive member connected to the end portion of the cable and extending through an axial end of the casing. The casing has an inner collar which cooperates with two movable nuts to adjustably mount the conductive member in an axial end of the casing, and an outer collar to secure the casing to a base plate. The conductive member is formed with an annular groove which receives a resilient sealing ring. The sealing ring slides along an inner circumferential wall of the casing and seals the interior of the casing from its exterior throughout the entire adjustment range of the conductive member. A protective electrode attenuates electrical fields in this axial end, and an electrically-insulating housing having a fluid medium contained in its interior surrounds the casing.

13 Claims, 2 Drawing Figures

TERMINAL CONNECTOR FOR ELECTRICAL CABLES

BACKGROUND OF THE INVENTION

In order to protect the electrical connection between a conductive element and an electrical cable carrying large amounts of current, electrically-insulating casings of a terminal connector are used to surround the electrical connection.

It is known in the prior art to make such casings out of porcelain, laminated plastic paper, or finely ground quartz-filled casting resin. These prior-art materials, however, have many disadvantages among which is that they have a comparatively low resistance to mechanical forces and require relatively expensive mounting arrangements in order for them to safely withstand such mechanical forces.

The material used in the prior art terminal connectors is also disadvantageous, because it makes the terminal connector very heavy inasmuch as the walls of the casing themselves are necessarily very thick in order to absorb these mechanical forces. Moreover, the relatively thick walls have prevented the casings from being easily placed in an oil-filled outer housing.

It is well known to construct inner and outer collars on porcelain casings. However, the mechanical tolerances of these collars are difficult to maintain due to the unavoidable shrinking of the procelain casings after manufacture. In such porcelain casings, shims or pads must be provided intermediate the casing and the mounting arrangement in order to counter the effects of the wrong-sized mechanical tolerances.

Moreover, the lack of precision in manufacturing porcelain casings means that adequate sealing of the interior of the casing is not possible.

SUMMARY OF THE INVENTION

Accordingly, it is a general object of the present invention to overcome the disadvantages of the prior art.

More particularly, it is an object of the present invention to make a terminal connector casing which is highly resistant to mechanical shock forces without having relatively thick walls.

Another object of the present invention is to make a terminal connector casing whose mechanical tolerances are held with precision, despite mass-production techniques.

Yet another object of the present invention is to make a terminal connector casing which is not subject to shrinkage.

A further object of the present invention is to eliminate the need for shims or pads for mounting the casing onto a support and/or for mounting a conductive member on the casing.

Still a further object of the present invention is to improve the sealing of the terminal connector casing.

Another object of the present invention is to doubly protect the electrical connection between a high-current electrical cable and a conductive element.

Still another object of the present invention is to provide a simple and economical terminal connector which is safe to use.

In keeping with these objects and others which will become apparent hereinafter, one feature of the invention resides in providing an electrically-insulating casing of resin-impregnated glass fibers, and particularly epoxy resin. The casing surrounds an end portion of an electrical cable, and a conductive member is connected to this end portion and extends through an axial end of the casing.

This feature of the present invention overcomes the disadvantages of the prior art and achieves the aforementioned objectives in a simple but novel manner. The casing is manufactured by a technique known as filament-winding. This technique is a method of precision winding with which hollow bodies can be manufactured in almost every form and dimension. Although the casing, thus manufactured, has a relatively thin wall thickness and a relatively low weight as compared with prior art casings, it possesses a high mechanical resistance to deformation. In addition, mechanical tolerances can be held very closely. The size of the casing is not subject to shrinkage, as is commonly the case with procelain casings. Moreover, the filament-winding technique permits the casing to be manufactured in any shape or form so that mechanical and electrical considerations can be taken into account.

Another feature of the present invention is that a simple and economical mounting arrangement can be designed since the mechanical tolerances can be held tightly. For example, inner and outer collars are integrally formed on the casing for use in mounting arrangements at the upper and lower end regions of the casing, respectively. Although such collars are known in porcelain casings, the requirement of shims or pads caused by the shrinkage effect of such casings means that these collars cannot be reliably used as a stable support surface. The resin-impregnated glass fiber collars of the present invention overcomes these disadvantages and serve as reliable mounting points.

Still another feature of the invention is that the conductive member is adjustably mountable in an axial end of the casing. The conductive member has a threaded portion, and a pair of nuts are adapted to directly bear against opposite axial ends of the inner collar and support the conductive member in any preselected position. No additional intermediate pieces are needed which results in the further advantage that electrical contact losses are minimized. Also, the adjustable feature facilitates the mechanical connection between the end of the electrical cable and the conductive member itself.

Yet another feature is that the interior of the casing can be better sealed, because the manufacture of the casing permits the accurate production of circumferentially-extending grooves in which a sealing ring can be seated with precision. This overcomes the prior-art problem of having grooves whose depths are too deep so that adequate compression of the sealing rings was inadequate heretofore.

Still a further feature is that the interior of the casing can be easily evacuated by opening passage means including bores and clearance grooves, and by subsequently closing such passageways by conventional means.

A protective electrode is provided to attenuate the electrical fields emanating from the electrical connection. In the prior art, a so-called insulator-head coil had to be manually brought to the place of assembly which, of course, increased installation costs. Such head coils are no longer needed; instead, a non-magnetic annular electrode having a constant field-strength profile is mounted at the upper region of the casing.

An additional feature is that the terminal connector be air-free. A housing, which is at least partially filled with a fluid medium which surrounds the casing, surrounds the electrical connection of the conductive member with the end of the electrical cable. The electrical cables are of the type generally used in oil or gas-pressurized systems.

The housing thus increases the reliability of the terminal connector, because two chambers are filled with an insulating fluid medium, such as oil. The two-chamber reliability feature was not formerly known with the prior-art procelain or laminated plastic paper material casings, since the wall thicknesses of the prior-art casings were too thick in order to be able to fit the casings within an exterior housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
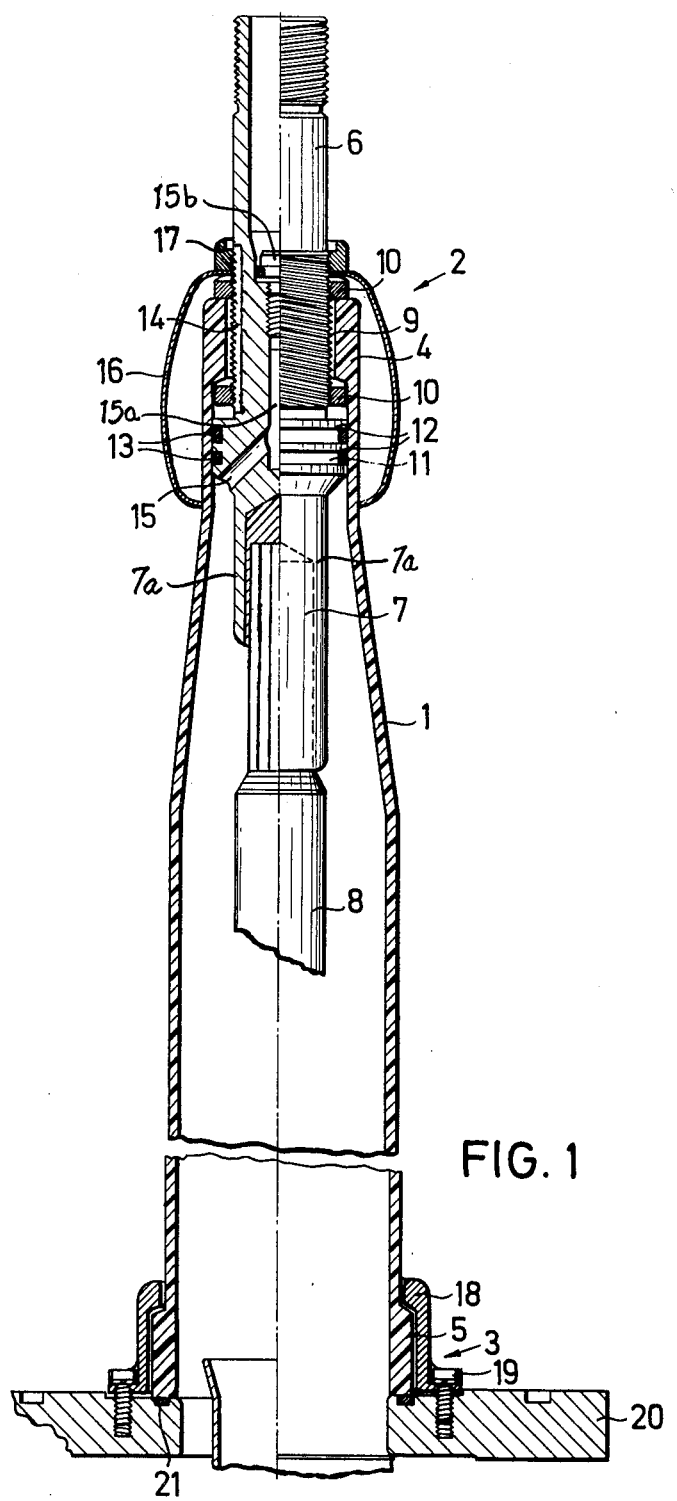
FIG. 1 is a partially sectioned side view of an apparatus according to the present invention.

Referring initially to the terminal connector illustrated in FIG. 1 of the drawing, it will be seen that reference numeral 1 identifies an electrically-insulating casing. Reference numeral 2 identifies an upper region of the casing 1, and reference numeral 3 identifies a lower region thereof.

The casing 1 is circumferentially complete and has a generally cylindrical configuration. The casing 1 is composed of resin-impregnated glass fibers, as will be described in greater detail below.

A conductive member or connector 6 extends through the upper axial end of the casing 1 at upper region 2 and is connected to an electrical cable 8, and particularly a high-current electrical cable, which extends through the lower axial end of the casing 1 at lower region 3. The electrical connection can be made in any known manner, for example, the conductive core 7 of the cable 8 is inserted into a bore of the conductive member 6 by press-fitting or by soft-soldering techniques. The portion of the conductive member 6 to the left of the center line in FIG. 1 is intended to illustrate the case in which the conductive core 7 of the cable 8 is inserted into the sleeve 7a of the conductive member 6 and soft soldered in place. The portion of the conductive member 6 to the right side of the center line is intended to illustrate the case in which a conductive core 7 of the cable 8 is inserted into the sleeve 7a of the conductive member 6 by press-fitting techniques.

The upper region 2 has an inner collar 4 which is elongated in the axial direction in a manner fashioned after a bottle-neck. The inner collar 4 is integral with the casing 1 and bounds an opening for the conductive member 6 to fit through with clearance.

The conductive member 6 has a threaded portion 9 over part of its exterior surface in the region of the inner collar 4. A pair of fastening nuts 10 are threaded onto threaded portion 9 and are axially movable so as to bear against opposite ends of the inner collar 4. The conductive member 6 is securely held in the upper axial end of the casing in any predetermined position.

The fastening nuts 10 are preferably split-nuts so that axial adjustment of the conductive member 6 within the inner collar 4 is facilitated. The lower nut 10 positioned below the inner collar 4 can then be disengaged from the lower end of collar 4 with the aid of a turning tool, such as a tubular wrench. The tool is inserted through the space or clearance formed between the conductive member 6 and the inner collar until the tool engages the lower nut 10.

The conductive member 6 also has at least one circumferential groove 11 bounded by a pair of circumferential sidewalls 12. The groove and/or grooves 11 and the sidewalls 12 are located below the threaded portion 9 within the interior of the casing 1 at the upper region 2. Sealing means, such as sealing rings 13, are provided in the grooves 11 for sealing the interior of the casing 1 from its exterior.

The conductive member 6 fits within the inner collar 4 with clearance. In addition, an axial passageway 14 in the form of an exterior groove on the outside of the conductive member 6 is provided and is used to evacuate that portion of the interior space of the casing 1 located above the sealing rings 13. Passage means or bore 15 is provided in conductive member 6 and provides communication between an interior passage 15a of the connector and the portion of the interior space of the casing 1 located below the sealing rings 13. Although the bore 15 is shown inclined upwardly towards the upper region 2, it can also be disposed at other angles. The bores 15, 15a, like the passageway 14, are used to evacuate the interior of the casing 1. Thus, evacuation means such as a pump can be mounted on the upper end of the conductive member 6 and, after the completion of the evacuation process, a sealing screw 15b can be screwed into the interior passage 15a.

A protective electrode 16 surrounds the upper region 2 and attenuates the electric fields present in this region. It is composed of non-magnetic material, and preferably of copper or aluminum. The protective electrode 16 is fastened in place by a nut 17 which is threaded onto the threaded portion 9 of the conductive element 6.

The lower region 3 has an outer collar 5 which is elongated in the axial direction and integral with the casing 1. A locking member 18 has an annular lip portion which is adapted to bear against one axial end of the outer collar 5. The screws 19 mount the casing 1 to a base plate 20. Sealing means 21 is located intermediate the other axial end of the outer collar 5 and the base plate 20, so as to seal the interior of the casing 1 in the lower region 3 from its exterior.

The casing 1 is made by pulling resin-impregnated glass fibers in tension from a so-called roving or strand of fibers. The resin may be epoxy resin. The glass fibers are wound onto a shaping member or mandrel which is a geometrical model of the casing 1. When the resin has set, the casing 1 will have a high tensile strength because of its reinforced construction, and a smooth outer finish which is especially desirable for high-voltage use.

Figure 2:
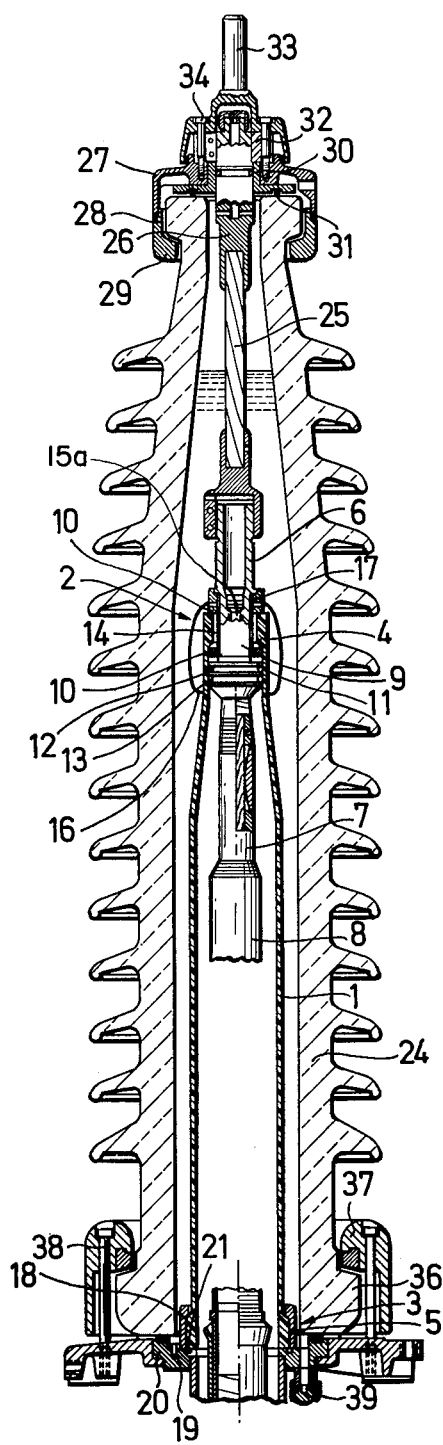
FIG. 2 is a partially sectioned side view of the apparatus of FIG. 1 surrounded by an exterior housing according to the present invention.

Referring now to FIG. 2, it will be seen that reference numeral 24 identifies a housing or insulator having an interior which accommodates the conductive member 6, the casing 1, the protective electrode 16 and their previously described elements. It will be understood that like reference numerals describe like parts. The housing 24 can be composed of any electrically-insulating material; for example, porcelain may be used.

The conductive member 6 is electrically connected to a series of conductive elements including the connecting piece 25 and the connector 26 which extends through the upper end of the housing 24. A fastening arrangement secures the conductive elements in place at the upper housing end and comprises an upper fastening part 27, a lower fastening part 29 which is welded to the upper fastening part 27 at the seam 28, and a flange part 30 intermediate the upper and lower fastening parts. A neck is formed on the housing 24, and the flange 30 and the lower housing part 29 bear against the opposite axial ends of the neck. Sealing means 31 is provided between the neck and the flange part 30 so as to seal the interior of the housing 24 from its exterior. A clamp 32 connected to another conductive member 33 by means of screws 34 completes the path of electrical current to the exterior of the housing 24.

At the lower end of the housing 24, an outer collar 36 is provided. Locking means 37 engages outer collar 36 and attaches the housing 24 to base plate 20 by means of screws 38.

The interior of the casing 1 and/or the interior of the housing 24 may be filled with oil or any other fluid medium. On the underside of the base plate 20, an oil outlet 39 is provided which is in communication with the interior of the housing 24. The outlet 39 is closed by the illustrated plug member. In FIG. 2, the interior of housing 24 need not be entirely filled with oil; it suffices that the oil cover the casing 1. Thereupon, the upper portion of the housing's 24 interior would then be maintained under a static over-pressure.

Thus, an air-free terminal connector for electrical cables which is especially useful in transformer applications is realized. The electrical connection between the cable 8 and the conductive member 6 is initially protected by evacuating the interior of the casing 1, filling the interior of the casing 1 with oil, and by surrounding the exterior of the casing 1 with an oil-filled environment. In effect, there is double safety feature to protect the electrical connection.

It will be understood that each of the elements described above, or two or more together, may also find a useful application in other types of constructions differing from the types described above.

While the invention has been illustrated and described as embodied in a terminal connector for electrical cables, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A terminal connector for electrical cables, particularly high-current electrical cables, comprising an electrically-insulating casing having a circumferential wall bounding an interior for accommodation of an end portion of an electrical cable, and an end region formed with an opening; a conductive member having an inner portion located within said casing and being connectable to the end portion of the cable, and an outer portion extending through said opening outwardly of said casing; adjusting means for movably mounting said conductive member through a range of positions relative to said casing; and means for sealing the interior of said casing from its exterior including during operation of said adjusting means, said sealing means including an annular projection located on said inner portion remote from said opening, said projection extending in radial direction towards said circumferential wall and being formed with a circumferential groove, said sealing means also including a resilient sealing element accommodated in said groove and having a side facing and in sliding engagement with said circumferential wall so as to seal the interior from the exterior of said casing through the entire adjustment range of said conductive member.

2. The connector as defined in claim 1, wherein said casing is circumferentially complete and bounds an interior space, said casing being composed of a plurality of glass fibers and epoxy resin.

3. The connector as defined in claim 1; and further comprising an axially-extending inner collar integral with said casing and located at said opening.

4. The connector as defined in claim 3, wherein said conductive member has a threaded portion; and wherein said adjusting means comprises means for positioning said conductive member at a selected one of said positions, said positioning means including a positioning nut located at an axial end of said inner collar and threadedly engaging said threaded portion at said axial end of said inner collar so as to position said conductive member at said selected position.

5. The connector as defined in claim 4, wherein said adjusting means further comprises means for securing said conductive member at said selected position, said securing means including a securing nut located at another axial end of said inner collar and threadedly engaging said threaded portion at said other axial end so as to secure said conductive member at said selected position.

6. The connector as defined in claim 3, wherein said conductive member has an exterior axially-extending groove and bounds a clearance with said inner collar when said inner portion of said conductive member is received in said casing; and wherein said adjusting means comprises a movable positioning nut in the interior of said casing at an axial end of said inner collar, said positioning nut having an access side so that a tool, upon insertion into said clerarance, may engage said access side and thereby move said positioning nut into and out of engagement with said axial end of said inner collar.

7. The connector as defined in claim 1, wherein said conductive member has another circumferential groove; and further comprising additional sealing means in said other groove for sealing said interior of said casing.

8. The connector as defined in claim 1; and further comprising passage means in said conductive member in communication with said interior of said casing and operative for evacuating the same, said passage means having an inclined interior bore and an axially-extending bore.

9. The connector as defined in claim 1; and further comprising a base plate, and means securing said casing to said base plate, including an axially-extending outer collar integral with said casing and located at another end region thereof.

10. The connector as defined in claim 9, wherein said securing means further includes a locking member; and further comprising auxiliary sealing means intermediate said casing and said base plate for sealing said interior of said casing.

11. The connector as defined in claim 1; and further comprising protective means surrounding said end region of said casing for attenuating electrical fields threat.

12. The connector as defined in claim 1; and further comprising an electrically-insulating housing having an interior surrounding said casing; and further comprising a fluid medium contained in said interior of said housing and at least surrounding said casing.

13. A terminal connector for electrical cables, particularly high-current electrical cables, comprising an electrically-insulating annular casing having a circumferential wall composed of circumferential convolutions of glass fibers impregnated with epoxy resin by a filament winding technique, said casing surrounding an end portion of an electrical cable and having at opposite axial ends of said casing integrally-formed outer and inner collars which extend generally in axial direction, said inner collar being formed with an opening at one of said axial ends; a conductive member having an inner portion connected to said end portion of said cable, and an outer portion extending through said opening at said one axial end of said casing, said conductive member also including a threaded section; adjusting means for adjustably mounting said conductive member at any of a plurality of positions relative to said one axial end of said casing, said adjusting means comprising positioning means in threaded engagement with said threaded section for positioning said conductive member at an axial end of said inner collar at a selected one of said positions, and securing means also in threaded engagement with said threaded section at another axial end of said inner collar for securing said conductive member at said selected position; and means for sealing the interior of said casing from its exterior including during operation of said adjusting means, said sealing means including an annular projection located on said inner portion remote from said opening, said projection extending in radial direction towards said circumferential wall and being formed with a circumferential groove, said sealing means also including a resilient sealing element accommodated in said groove and having a side facing and in sliding engagement with said circumferential wall so as to seal the interior from the exterior of said casing at all of the positions of said conductive member obtained by operation of said positioning means and said securing means.

* * * * *